US007139749B2

(12) United States Patent
Bossman et al.

(10) Patent No.: US 7,139,749 B2
(45) Date of Patent: Nov. 21, 2006

(54) METHOD, SYSTEM, AND PROGRAM FOR PERFORMANCE TUNING A DATABASE QUERY

(75) Inventors: Patrick Dooling Bossman, Alexandria, VA (US); You-Chin Fuh, San Jose, CA (US); Chan-Hua Liu, San Jose, CA (US); Ping Wang, San Jose, CA (US); Yun Wang, Saratoga, CA (US); Jie Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 10/373,237

(22) Filed: Feb. 24, 2003

(65) Prior Publication Data
US 2003/0182276 A1 Sep. 25, 2003

Related U.S. Application Data

(60) Provisional application No. 60/366,051, filed on Mar. 19, 2002.

(51) Int. Cl.
*G06F 17/30* (2006.01)
(52) U.S. Cl. ............. 707/3; 707/1; 707/5; 707/102; 707/104.1; 715/762
(58) Field of Classification Search ........... 707/1–10, 707/100–104.1, 200–206; 715/700, 762
See application file for complete search history.

(56) References Cited

U.S. PATENT DOCUMENTS

| | | | | |
|---|---|---|---|---|
| 5,761,654 A * | 6/1998 | Tow | ............. | 707/2 |
| 5,852,818 A * | 12/1998 | Guay et al. | ............. | 707/1 |
| 6,266,658 B1 * | 7/2001 | Adya et al. | ............. | 707/2 |
| 6,321,218 B1 * | 11/2001 | Guay et al. | ............. | 707/2 |
| 6,374,257 B1 * | 4/2002 | Guay et al. | ............. | 707/103 R |
| 6,460,045 B1 * | 10/2002 | Aboulnaga et al. | ......... | 707/102 |
| 6,529,901 B1 * | 3/2003 | Chaudhuri et al. | ............. | 707/3 |
| 6,598,038 B1 * | 7/2003 | Guay et al. | ............. | 707/2 |
| 6,704,724 B1 * | 3/2004 | Ellmann et al. | ............. | 707/4 |
| 6,766,318 B1 * | 7/2004 | Guay et al. | ............. | 707/3 |
| 6,801,903 B1 * | 10/2004 | Brown et al. | ............. | 707/2 |

OTHER PUBLICATIONS

IBM Corp., "Using AS/400 Database Monitor and Visual Explain To Identify and Tune SQL Theories.," Jan. 2001, pp. 1-40 [online], available from ibm.com/redbooks.
IBM Corp., "DBS UDB V7.1 Performance Tuning Guide," Dec. 200, pp. 1-395 [online], available from ibm.com/redbooks.
IBM Corp., "DB2 UDB for AS/400 Visual Explain Illustrating the Secrets," pp. 1-36 [online], available from ibm.com/redbooks.
Hellerstein, Joseph M. "Optimization Theories for Queries with Expensive Methods." University of California, Berkeley. In ACM Transactions on Database Systems, vol. 23, No. 2, Jun. 1998, pp. 113-157.

* cited by examiner

*Primary Examiner*—Shahid Alam
*Assistant Examiner*—Jean Bolte Fleurantin
(74) *Attorney, Agent, or Firm*—David W. Victor; Konrad Raynes & Victor LLP (57) ABSTRACT

Provided are a method, system, an program for tuning a database query. Provided are a base access plan to implement the database query and statistics including information on a layout of the database against which the query will be executed. The statistics are processed to determine performance problems with the base access plan as part of a first analysis of the base access plan and the determined performance problems are processed as part of a second analysis to provide an analysis of the determined performance problems and processing cost of the base access plan. Recommendations are generated to tune the base access plan to improve performance.

27 Claims, 4 Drawing Sheets

METHOD, SYSTEM, AND PROGRAM FOR PERFORMANCE TUNING A DATABASE QUERY

RELATED APPLICATIONS

This application claims benefit to provisional application No. 60/366,051, filed on Mar. 19, 2002, which provisional patent application is incorporated herein by reference in its entirety.

BACKGROUND OF THE INVENTION

1. Field of the Invention

The present invention relates to a method, system, and program for performance tuning a database query.

2. Description of the Related Art

Data records in a relational database management system (RDBMS) in a computer are maintained in tables, which are a collection of rows all having the same columns. Each column maintains information on a particular type of data for the data records which comprise the rows. One or more indexes may be associated with each table. An index is an ordered set of pointers to data records in the table based on the data in one or more columns of the table. In some cases, all the information needed by a query may be found in the index, making it unnecessary to search the actual table. An index is comprised of rows or index entries which include an index key and a pointer to a database record in the table having the key column values of the index entry key. An index key is comprised of key columns that provide an ordering to records in a table. The index key columns are comprised of the columns of the table, and may include any of the values that are possible for that particular column. Columns that are used frequently to access a table may be used as key columns. Using an index to search and access rows in the associated table substantially improves query performance.

Database tables may be accessed using the Structured Query Language (SQL) commands, which comprises a recognized language to query, access and manipulate data in a database. The SQL language includes set operators that define operations to be performed when searching columns of database tables. For instance, a SQL set operator may look for all records having a field that satisfies a certain search condition, such as equal to, less than, etc. to a certain value. Moreover, the search may involve joins. A join operation combines or concatenates the rows from different tables and then searches for those concatenated rows that satisfy a search predicate. Rows from the tables involved in a join operation that do not satisfy the predicate or condition are excluded from the join result.

The method for retrieving data from a specific table or joined tables, such as whether indexes are used or not, is called the access path. The access plan for an SQL query involves a set of access paths. The component within the DB2 query engine that determines the access plan to be used is known as the optimizer. During the static preparation of an SQL statement, the SQL compiler is called to generate an access plan. The access plan contains the data access strategy, including index usage, sort methods, locking semantics, and join methods. The executable form of the SQL statement is stored in the system catalog tables when a BIND command is executed (assuming a deferred binding method). This is called a package.

One challenge in managing a relational database involves providing techniques to optimize the SQL queries, also known as SQL tuning. SQL tuning is the process of identifying poorly structured access plans, analyzing why the plan is poorly structured, and taking some action to improve the performance of the query. The access plan may provide poor performance because the physical design of the database does not coincide with an efficient access path, the SQL statement is coded inefficiently, information (or statistics) provided to the optimizer are insfficient or inaccurate, and the cost model is inaacurate and imperfect. Further, for complex queries, the optimizer uses heuristic algorithms which may trim the search space to conserve time and space. Such heuristic algorithms might adversely effect a determination of a preferable access plan.

Some prior art SQL tuning programs are deployed when database administrators or application developers encounter a performance problem due to an SQL statement with an inefficient access path. In the prior art, the administrator might look at the access plan and attempt to determine the performance bottleneck, e.g., an inefficient access method, bad join sequence, etc., rewrite the query, collect statistics, such as the cardinality and frequency, alter the physical design, perform database maintenance, such as reorganization on the table spaces and indexes, alter statistics to influence the optimizer, and provide optimization hints to the optimizer. Examples of an SQL tuner include the International Business Machines Corp. (IBM) Visual Explain software product, described in the publications "Using AS/400 Database Monitor and Visual Explain To Identify and Tune SQL Queries", published as a Redpaper, (January 2001) and "DB2 UDB for AS/400 Visual Explain Illustrating the Secrets", Redpaper No. 0505 (January 2001), which publications are incorporated herein by reference in their entirety. SQL tuning techniques are also described in the IBM publication "DB2 UDB V7.1 Performance Tuning Guide", IBM publication no. SG24-6012-00 (December 2000), which publication is incorporated herein by reference in its entirety.

There are drawbacks in administrators using SQL tuning tools. Often, the database administrator lacks the skill and time to investigate the root cause of the SQL performance problems and implement adequate solutions, thereby resulting in inconsistent methods of analysis and solutions to SQL tuning that are limited by the skill and experience of the database administrator. In fact, there are a limited number of database administrators that possess sufficient expertise to collect statistics, build indexes, rewrite an SQL statement, consider all possible solutions and then select a best access plan. Further, even though certain SQL tools provide a visualization of an access plan in a Graphical User Interface (GUI), many database administrators are still unable to select an optimal path merely based on a visualization of an access path graph.

For these reasons, there is a need in the art to provide improved techniques for SQL tuning.

SUMMARY OF THE DESCRIBED IMPLEMENTATIONS

Further provided are a method, system, an program for tuning a database query. Provided are a base access plan to implement the database query and statistics including information on a layout of the database against which the query will be executed. The statistics are processed to determine performance problems with the base access plan as part of a first analysis of the base access plan and the determined performance problems are processed as part of a second analysis to provide an analysis of the determined performance problems and processing cost of the base access plan. Recommendations are generated to tune the base access plan to improve performance.

In further implementations, in the first analysis, inconsistencies and incompatibilities between the database being queried and the base access plan are considered in determining the performance problems.

Still further, the analysis of the determined performance problems resulting from the second analysis and the generated recommendations are processed to generate optimization hints, wherein the optimization hints indicate modifications to the base access plan to produce a modified access plan having improved performance over the base access plan. A user interface providing a visualization of the optimization hints is generated.

Further provide are a method, system, and program for generating statistical information concerning database objects accessed by a database query, wherein the statistical information is used to determine an access plan for a query on the database objects. Initial statistical information is used to generate an access plan. The access plan, query statements, and database structure are processed to determine important statistical information for the query statement. The initial statistical information is analyzed to determine whether the initial statistical information includes the important statistical information. Information on important statistical information not included in the initial statistical information is rendered.

In further implementations, if a portion of the initial statistical information comprises important statistical information, then a determination is made as to whether the portion of the initial statistical information is incomplete and/or inaccurate and information on the portion of the initial statistical information that is inaccurate and/or incomplete is rendered.

The described implementations provide techniques to guide a user through an analysis of a database query plan to ascertain performance problems and costs related to the access plan and generate recommendations to allow the user to further optimize and improve on the query access plan.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
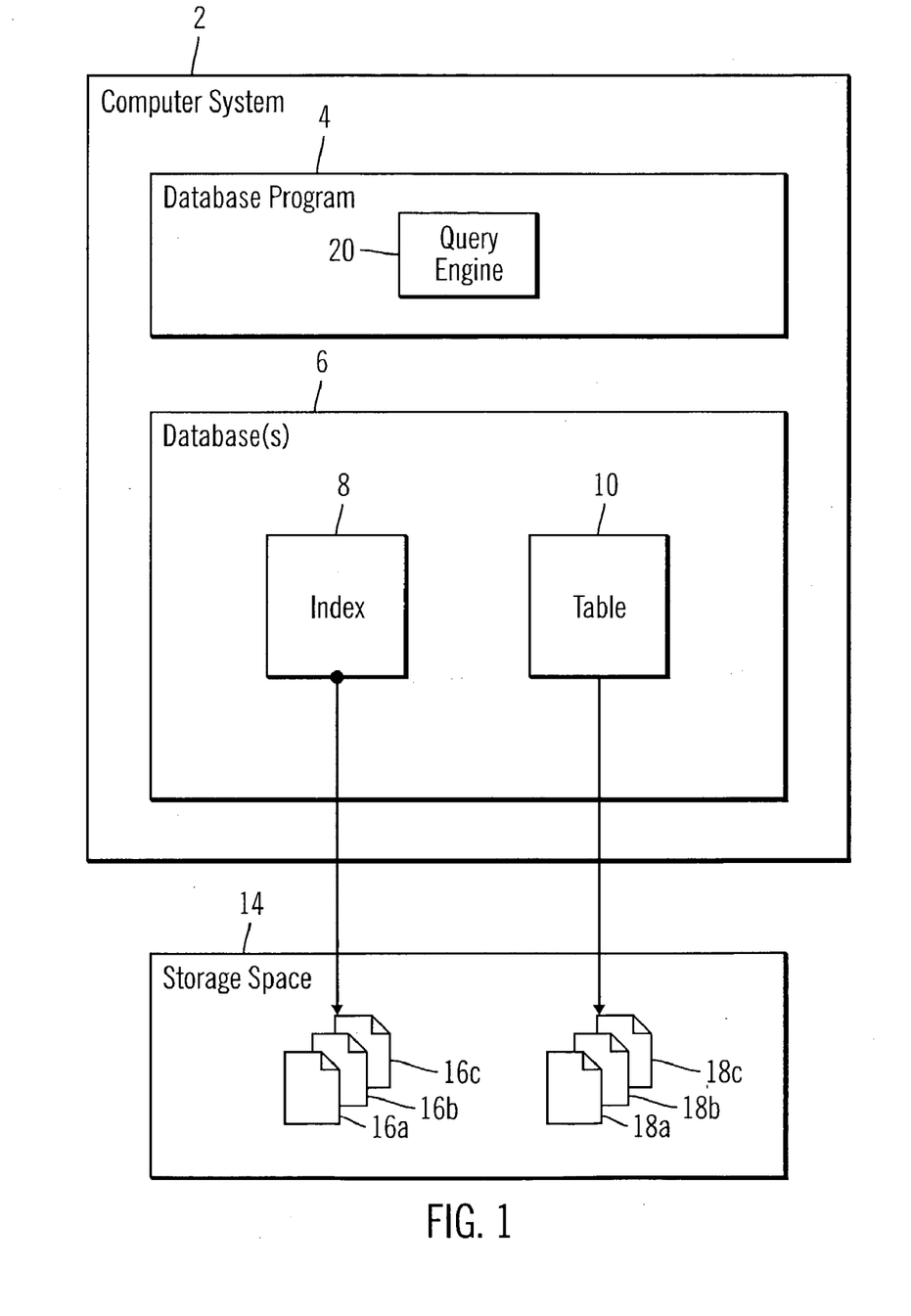
FIG. 1 illustrates the arrangement of database tables in a manner known in the art.

FIG. 1 illustrates a computing environment in which a database may be implemented. A computer system 2, which may be a computer including an operating system such as MICROSOFT WINDOWS 98 and WINDOWS NT, AIX, OS/390, OS/2, MVS, etc., includes a database program 4, such as DB2, MICROSOFT Access, Oracle Corporation's ORACLE 8, etc. The database program 4 is used to access database information maintained in one or more databases 6. The database(s) 6 may consist of one or more indexes 8 and one or more tables 10. The indexes 8 provide an ordered set of pointers to data in the table 10 based on the data in one or more columns of the table. Further details of the structure and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

**Microsoft, Windows, and Windows NT are registered trademarks of Microsoft Corporation; DB2, AIX, OS/390, and OS/2 are registered trademarks of IBM, MVS is a trademark of IBM; and Oracle8 is a trademark of Oracle Corporation.

A storage space 14 stores the actual data sets that include the data for the indexes and tables. The storage space 14 includes the pages 16a, b, c which contain the index entries for the index 8, such as the leaf pages when the index 8 is comprised of a B-tree. The storage space 14 further includes pages 18a, b, c of the records in the table 10. The storage space 14 may comprise a non-volatile storage space, such as a direct access storage device (DASD), which is comprised of numerous interconnected hard disk drives. Alternatively the storage space 14 may comprise storage pools within non-volatile memory, or a combination of non-volatile and volatile memories.

The database program 4 includes a query engine 20 that may receive a search request on attributes in dimension tables to locate records in a fact table. In such case, the query engine may join the multiple tables, using optimization techniques known in the art, to optimally determine the order of joining the tables for purposes of searching for matching values.

Figure 2:
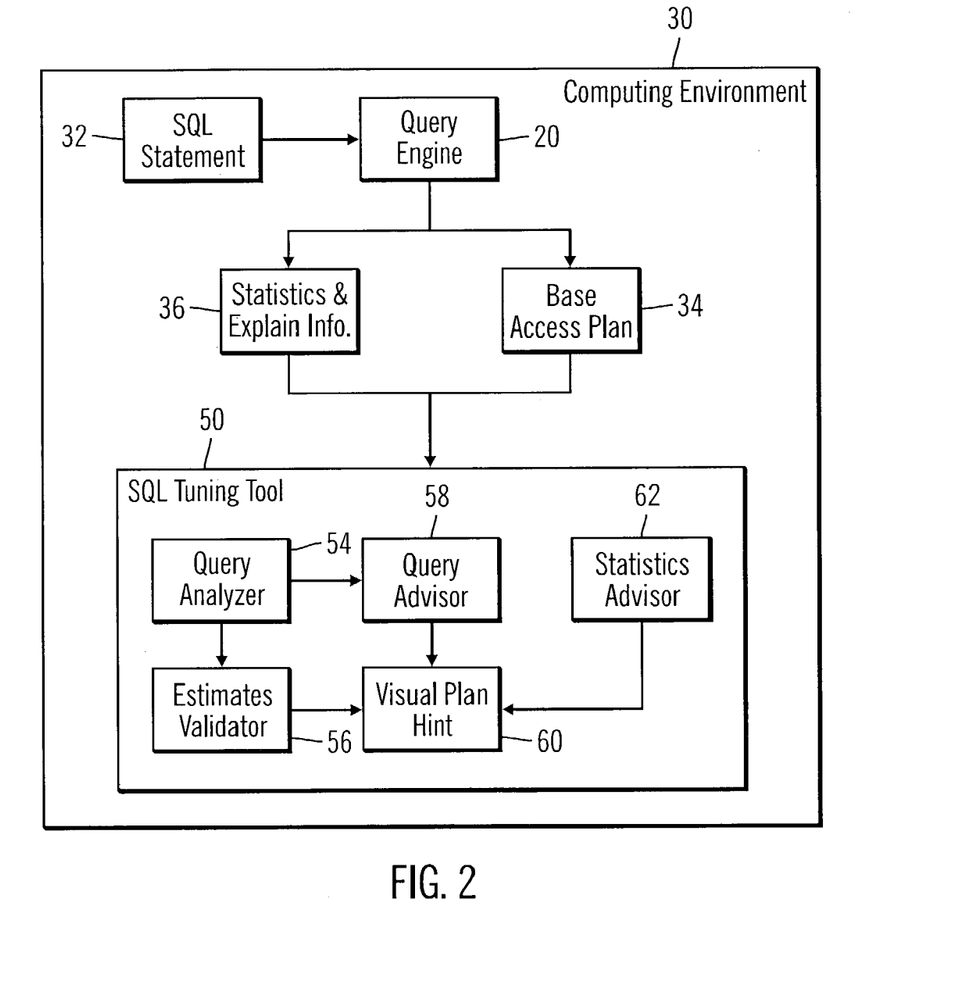
FIG. 2 illustrates a computing environment in which aspects of the invention are implemented.

FIG. 2 illustrates a computing environment 30 for implementing SQL tuning techniques in accordance with implementations of the invention. The computing environment 30 may comprise one or more computer systems implementing the components therein, where the components may communicate over a network connection or shared memory. In the computing environment, the query engine 20, such as the engine 20 shown in FIG. 1, receives an SQL statement 32 and includes an optimizer (not shown) to generate a base access plan 34 to implement the SQL statement 32. The query engine 20 optimizer utilizes statistics and explanation information 36 to generate an optimal base access plan 34. Such statistics 36 include information on the physical layout of the database against which the SQL statement 32 as understood by the query engine 20. In certain implementations, the query engine 20 may output the base access plan 34 and statistics and explanation information 36 in a text document, such as an Extensible Markup Language (XML) document or other text format.

The statistics 36 and base access plan 34 are provided as input to an SQL tuning tool 50 which includes program components 54, 56, 58, 60, and 62 that are involved in performance tuning the received base access plan 34 in accordance with implementations of the invention. A query analyzer 54 component receives the base access plan 34 and statistics and explanation information 36 from the query engine 20 and uses heuristic rules to determine SQL performance problems, incompatible statuses, bottleneck information, etc. The query analyzer 54 may use heuristics to identify common causes of SQL performance problems. The heuristic rules employed by the query analyzer 54 may be added, removed, modified and prioritized in different orders by a user of the SQL tuning tool 50. The output of the query analyzer 54 may go to the estimates validator 56 or query advisor 58 components.

The estimates validator 56 provides a more detailed analysis of the estimated cost and performance problems associated with the base access plan 34 than the analysis provided by the query analyzer 54, and may validate the performance analysis produced by the query analyzer 54. In performing its analysis of the base access plan 34, the estimates validator 56 may use the output of the query analyzer 54, as well as the output 34 and 36 from the query engine 20. The estimates validator 56 uses extended explain information, catalog statistics, query analysis produced by the query analyzer 54, and/or user input to validate optimization estimates. The estimates validator 56 may generate execution plans and identify areas of error in estimation, such as filter factor estimation, index selectivity estimation, etc. The estimates validator 56 may output performance analysis of the base access plan 34 to the user to take action. In this way, the query analyzer 52 may performs a preliminary analysis, such as analyzing inconsistences or incompatibilities between the database being queried and the base access plan 34. The estimates validator 56 may provide a more thorough analysis of the performance problems and processing cost.

The query advisor 58 receives input from the query analyzer 54, and applies heuristic rules to determine problems with the base access plan 34 and inconsistencies with the physical database structure that will be queried. In certain instances, the query engine 20 optimizer may have selected a problematic base access plan 34 because of lack of knowledge of the structure of the database tables subject to the query. The query advisor 58 provides information on problems with the base access plan 34 and/or the structure of the database tables to be queried. The query advisor 58 may generate recommendations to tune the base access plan 34 and/or database tables to be queried to improve query performance.

With certain implementations, the query analyzer 54 effectively produces intermediate results that may be used by the estimates validator 56 and query advisor 58. The estimates validator 56 and query advisor 58 may also receive user input in performing their analysis.

After running the query analyzer 54 and estimates validator 56, the user may then run the query advisor 58, which generates specific recommendations a customer may use to tune a query. Examples of such recommendations from the query advisors 58 includes reorganizing table spaces, request collection of more accurate and complete statistics, creation of indexes, repartitioning of table spaces, etc.

The above described tools provide expertise and useful, query specific information to an inexperienced database administrator to guide the administrator step-by-step to solve optimization problems. The described SQL tuning tool 50 provides analysis and validation capabilities to assist the administrator in providing advanced SQL tuning of the base access plan.

Providing Optimization Hints to the SQL Tuning Tool

In certain implementations, the database administrator may want to override the optimization suggested by a query engine optimizer. An optimizer may yield sub-optimal access paths. For this reason, more experienced administrators may want to override the optimizers choice of a path. For instance, the administrator may want to force an efficient access path while the root cause of a sub-optimal access path is determined. In a regression situation, the administrator may want to fallback to a previously selected efficient access path while investigating the cause of the regression. Further, the administrator may want to lock in an optimizer determined efficient access path for stability to ensure consistent response time across releases and ensure consistent response times between maintenance, rebinds, and application changes. Also the administrator may want to streamline access path selection by reducing access paths considered to be sub-optimal. Further, the administrator may want to permanently override the optimizers decision with administrator determined efficient access paths. For instance, in certain cases, expert administrators may identify more efficient access paths than the optimizer if the administrator has certain information unknown to the optimizer.

Notwithstanding, determining useful optimization paths is a complex process. For instance, to develop meaningful optimization hints to modify a base access plan, the administrator would have to know the plan table structure, optimization hint constraints, and available access path choices, such as join methods, indexes to use, etc. The plan table exposes the access path to the administrator. Further, an administrator could directly modify the access path by modifying records in the plan table. Such complexities have prevented administrators from providing optimization hints, even when such hints could greatly improve the selection of the optimal access plan.

The visual plan hint component 60 provides administrators an integrated approach to generate, modify, and validate partial and complete optimization hints in a manner that reduces the time and skill required to temporarily or permanently override an inefficient base access plan. A partial hint is when the optimization hint is provided to modify a part of the base access plan 34, and a complete hint is where optimization hints are provided for every step of the base access plan 34. The visual plan hint 60 provides a simplified mechanism for optimization hint generation and modification, a graphical view of the current access path, component level modification of an access path, incremental validation of optimization hint validation, assistance with optimization hint problem determination, generation of a partial or complete optimization hint, and the capability to facilitate both dynamic SQL as well as static SQL.

The visual plan hint 60 receives as input the plan table of the base access plan 34, and may provide a visualization in a GUI of the access plan. Further, the visual plan hint 60 may display in the GUI 66 optimization hints and other suggested modifications based on output from the estimates validator 56 and query advisor 58. Further the visual plan hint 60 can also receive administrator input. The visual plan hint 60 includes heuristics to determine optimization hints from the information from the estimates validator 56 and query advisor 58 to modify the base access plan 34. Further, the visual plan hint 60 may generate a user interface to allow the administrator to graphically modify the base access plan 34.

The visual plan hint component 60 receives an optimizer selected access path. The visual plan 60 then generates an explanation of the query in a GUI for the SQL tuning tool 50. The visual plan hint component 60 then accesses plan information from a plan table based on the query number used in the explain information and timestamp. The visual plant hint 60 analyzes the plan table records and constructs a graph on a query block basis using the optimizer base access path 34. The visual plan hint 60 may display a visualization of each query block as a separate graph in the user interface. The administrator may view the access plan structure inside each query block.

The visual plan hint component 60 may further provide the administrator with graphical options for modifying the base access plan, such as graphical elements the administrator can select to implement modifications. The visual plan hint component 60 may allow the administrator to select the join sequence of all tables in a query block in a single operation. Without this feature, the administrator would have to modify values in several records of the plan table, which operation would be very susceptible to errors. The visual plan hint 60 allows the administrator to select a join sequence, and the visual plan 60 will automatically implement the administrator selected join sequence in the plan table to avoid any administrator generated errors. Further, the visual plan 60 may allow the administrator to select the join method. For instance, the visual plan hint 60 may display in the user interface a list of valid join methods depending on the context of the join. For example, a full outer join only allows sort merge join, a left outer join only allows sort merge join and nested loop join, etc. The visual plan hint component 60 may further display to the administrator a list of valid table access methods, such as table space scan and index access, which the administrator may then select. For instance, if index access is chosen, a list of available indexes is provided for the administrator to chose. The user may further select how a particular index is utilized.

With the described implementations, the visual plan hint component 60 allows the user to change all or just specific portions of an optimized base access plan 34. For instance, if a user wants to select a different index for the base access plan, then visual plan hint 60 would enable the user to select a query block and specific table in the query block for which an index will be chosen. The user may also alter the degrees of parallelism chosen, to indicate which parts of the access plan will execute in parallel by concurrently executing processes and/or processors. Still further, the user could use the visual plan hint 60 to restructure every part of the base access plan in a complete optimization, from the table join sequence, join method, access type, parallelism, etc.

The base access plan 34 adjusted with user selected hints entered through the visual plan hint component 60 may then be subject to validation by the estimates validator 56 to ensure that the optimization hint produces a modified plan that is accurate and complete. The estimates validator 56 may produce error feedback on the modification suggested by the hint, and provide suggestions for further modification for the user to review. The user may then invoke the visual plan hint 60 to make further changes until the desired access path is achieved.

The described implementations thus provide users an interactive environment to generate, modify and validate partial and complete optimization hints. The described visual plan hint 60 reduces the time and skill required to permanently override an inefficient access path by hiding the complexity of generating an optimization hint from the user. Further, the described visual plan hint 60 supports both partial and complete hint. Allowing complete hint is needed for regression avoidance between releases of static SQL.

Thus, the visual hint plan 60 provides the user with information about an entire base access plan 34 so that the user does not have to gather this information from other sources. Certain implementations provide in the SQL tuning tool 52 an integration of the optimization hint component along with the query analyzer to generate an optimal access plan. The described visual hint plan 60 may group hints into different categories and displays them differently based on the category of the hint type to provide better understanding of the nature of the hint to avoid the user selecting an optimization hint that will result in an error. Further, the visual hint plan 60 may present graphical representations of the effect of the hint, such as a graphical representation of the join relationships to provide the user better understanding. The SQL tuning tool 50 will further provide validation of the application of the optimization hints to the base query access plan. For instance, if the user selects a table space scan as the access method, the indexes will be disabled. Still further, the estimator validator 56 when providing error information may also provide suggestions on how to refine the hint to improve optimization. Further, the described implementations allow for incremental application and validation of optimization hints.

Statistics Advising

An optimal access plan depends in part on accurate and complete statistics about physical database objects accessed by the SQL statement. Statistics, such as statistics 36, may be stored in a catalog that provides information on the number of records and pages in the table(s) involved in a query, the depth and breadth of indexes, the ordering of records in an index, and filter factor statistics, which are used by the optimizer to compute the estimated costs of the access paths so that the query analyzer 54 can choose the access path having the least expensive estimated cost. For this reason, it is important that the statistical information used to generate the access plan 34 is complete and accurate, so that the determination of the estimated cost of the access plan accurately approximates within an acceptable degree of error the actual cost. Using inaccurate or incomplete statistics may result in determination of a sub-optimal access path or unstable access path.

For instance, if the query engine 20 uses incomplete or inaccurate statistics 36 to generate the base access plan 34, then the optimizer can no longer differentiate efficient access paths from inefficient access paths, thereby increasing the likelihood of selection of a sub-optimal access path. On the other hand, more accurate and complete statistics result in determinations of relatively more efficient access paths.

As discussed, using inaccurate or incomplete statistics may result in unstable access paths. An access path is considered unstable when several access paths are very close in estimated cost, but in fact have significantly different actual costs. When access paths are unstable, the optimizer may produce a path that is optimal at first, but a subsequent minor change in the statistics or operating environment may cause a previously determined less efficient access path to become more efficient than the previously determined efficient access path. In such cases, the user experiences a regression because a previously selected optimal or efficient access path becomes less efficient, and poorly performing.

For these reasons, it is desirable to obtain and utilize statistics that are as complete and accurate as possible to increase the efficiency and stability of the access paths.

The determination of complete and accurate statistics is dependent on both the SQL statement and physical design of the underlying database tables to which the SQL statement applies. The SQL statement determines the tables that are accessed, predicates which are selected, as well as any aggregation or ordering required. Different SQL statements against the same table may require statistics to accurately estimate selectively. For example, a range predicate against column C1 requires different statistics than an equals predicate against the same column. Further, the physical design of the database tables determines candidate indexes that may be used in the selected access plan, predicates which may be matching, screening or non-indexed. Further, for the same SQL statement, the statistics required to accurately estimate the cost could be different based on the physical design of the table(s) subject to the statement. For instance, the same table in different database environments may have different index designs. In the same tables in different database environments, different columns may be indexed, the same columns may be indexed in different orders, or the same logical table may have different partitioning schemes. Thus, different statistics may be needed to accurately estimate the cost of a same SQL statement against a same table in different database environments.

Figure 3:
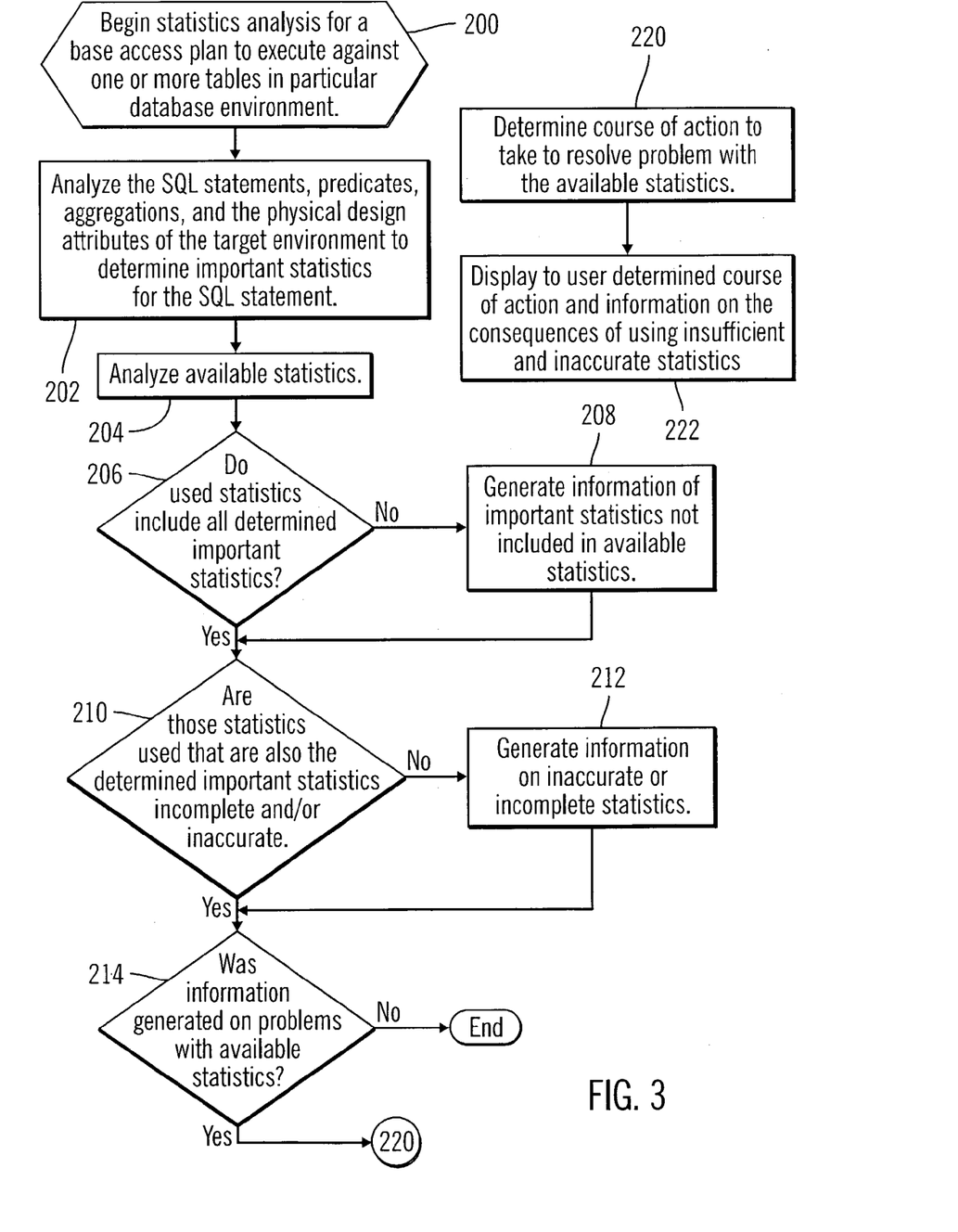
FIG. 3 illustrates logic to analyze the statistics used to generate the base access plan in accordance with implementations of the invention.

FIG. 3 illustrates logic implemented in the statistics advisor 62 to determine whether the statistics available for a query are acceptable. Control begins at block 200 to begin the statistics analysis of the statistics 36 used in generating the base access plan 34 by the query engine 20 optimizer. The statistics advisor 62 may receive input from other components 54, 56, and 58, as well as the statistics 36 provided by the query engine 20. Other statistics may be accessed from system tables. The statistics advisor 62 analyzes (at block 202) the access plan, predicates, aggregations, and the physical design attributes of the target environment to determine important statistics for the SQL statement 32. The statistics advisor 62 may use heuristics and other models to determine what statistics should be used to generate an optimal access plan for the SQL statement 32 given the operating environment. The statistics advisor 62 would further analyze (at block 204) the statistics 36 used to generate the base access plan 34. The statistics advisor 62 then determines (at block 206) whether the statistics 36 include all determined important statistics. For instance, the statistics advisor 62 may determine whether the statistics 36 do not include the size of tables and candidate indexes and the default statistics for the columns used as predicates. Further, the statistics 36 used may be insufficient because they may lack interpolation statistics for columns with range predicates, all appropriate multi-column cardinality statistics, lack single/multi column non-uniform distribution statistics for low cardinality columns (groups), etc. If (at block 206) the used statistics 36 are insufficient, then the statistics advisor 62 would generate (at block 208) information on important statistics that are missing.

From block 208 or the yes branch of 206, control proceeds to block 210 to determine whether any of the used statistics 36 that were also determined to be important are also incomplete and/or inaccurate. Inaccuracies of the statistics 36 may occur if the column cardinality or column group cardinality is greater than the cardinality for a table, if the column cardinality is greater than the column group cardinality when the column group includes the column, if the sum of distribution statistics is greater than one, if the full unique index cardinality is less than the cardinality of the table, whether the statistics were collected at significantly different times, etc. If (at block 210) available statistics are incomplete and/or inaccurate, then the statistics advisor 62 will generate (at block 212) information on the incomplete and/or inaccurate statistics.

If (at block 214) there was no information generated on incomplete, inaccurate or insufficient statistics at blocks 208 and 212, then the statistics 36 used by the optimizer are acceptable. Otherwise, if (at block 214) certain of the used statistics 36 are incomplete, inaccurate and/or insufficient, then the statistics advisor 62 employs (at block 220) heuristics to determine a course of action to resolve the problem with the statistics 36. The statistics advisor 62 may further display (at block 222) information to the user on the determined course of action to resolve problems with the available statistics and display information on the consequences of using deficient statistics to educate the user as to the problems with faulty statistics. In providing information, the statistics advisor 62 may provide a comparison of the estimated filtering with the actual amount of filtering to provide insight into why inefficient access paths are chosen. In this way, the user is provided information on the errors that may result by using deficient statistics.

The described statistics advisor 62 applies heuristics to analyze statistics, where the heuristics may be based on the experience of expert database administrators to identify probable statistical problem areas. Further, by providing information on missing statistics, the described implementations automate the process for generating the statements used to collect the statistics and generates specific suggestions to improve the access path through better statistics. This in turn relieves the burden from the database administrator of having to analyze deficiencies in the available statistics. Further, by ensuring that all needed statistics are used, the efficiency of the base access plan is improved, thereby improving the performance of the tuning query. Further, by incorporating the heuristics of expert database administrators and providing information on the statistics gathering process, the described statistics analyzer tool educates inexperienced database administrators on how to select statistics to improve the cost estimation of the available access paths.

The statistics analyzer 62 may provide its output directly to the user or to the visual plan hint 60 to present to the user.

The described implementations guide the database administrator through a structured, consistent, and complete analysis of the statistics required to accurately estimate the cost of available access paths for the SQL performance problems posed by the subject SQL statement 62. Further, the described implementations provide a tool for determining whether the statistics 36 are useful for both the particular SQL statement and the particular database environment to which the SQL statement will be applied, such as the physical structure of the database environment. The user may then implement the suggested solution to provide any missing statistics that are needed to optimize the best access plan selection.

Additional Implementation Details

The SQL tuning tool described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The operations of the SQL tuning tool were described with respect to particular program components 54, 56, 58, 60. In alternative implementations, the described operations may be performed by a different group of components, including more or less than the described components. Further, certain of the operations described herein may be performed by components external to the SQL tuning tool, such that the SQL tuning tool would make calls to external programs perform certain operations.

The SQL statement may comprise any type of query, involving any number of tables, indexes or joins. If a join is involved in the SQL statement operation, then the join may involve a large number of tables.

With the described implementations, any of the components 54, 56, 58, 60, and 62 in the SQL tuning tool 50 may provide output directly to the user or to the visual plan hint 60 to present to the user in an integrated user interface.

The discussion and flowcharts describe specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

Figure 4:
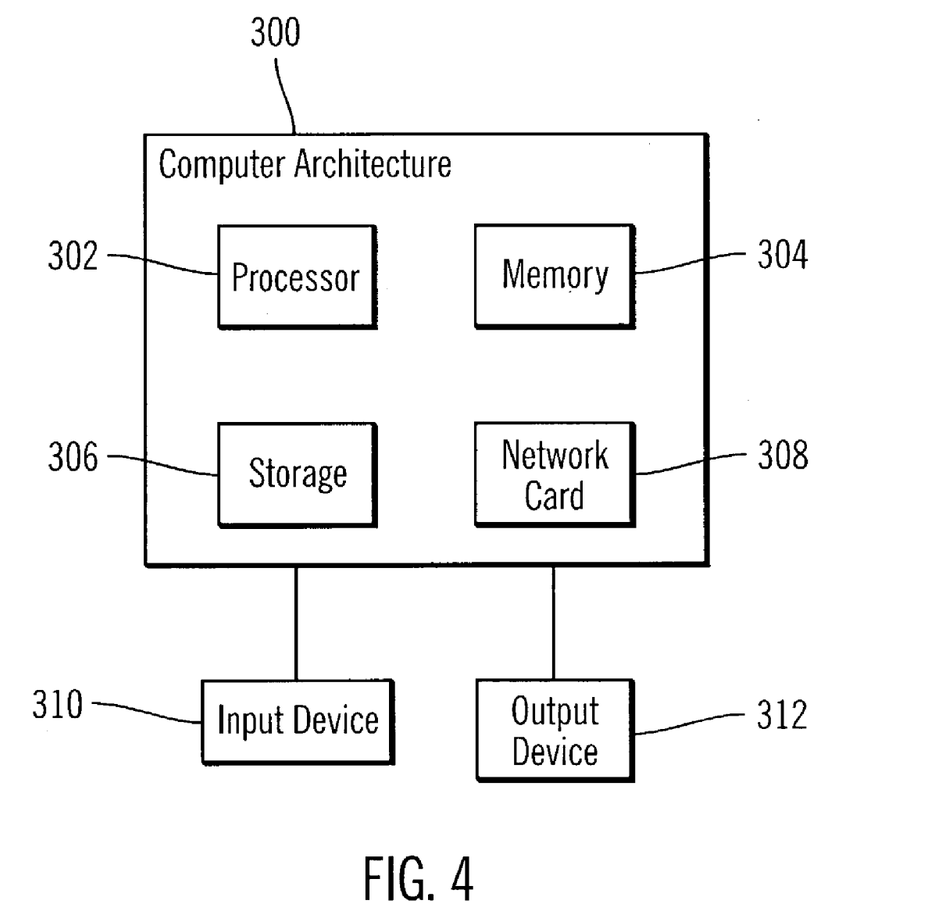
FIG. 4 illustrates a computing architecture that may be used with the described implementations.

FIG. 4 illustrates one implementation of a computer architecture 300 of the computing environment shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

The invention claimed is:

1. A method for tuning a database query for a computer database, comprising:
   providing a base access plan to implement the database query;
   providing statistics including information on a layout of the database against which the query will be executed;
   processing the statistics to determine performance problems with the base access plan as part of a first analysis of the base access plan;
   processing the determined performance problems as part of a second analysis to provide an analysis of the determined performance problems and processing cost of the base access plan;
   generating and displaying recommendations to tune the base access plan to improve performance;
   receiving selection of one of the displayed recommendations to tune the base access plan; and
   modifying the base access plan with the selected displayed recommendation;
   processing the analysis of the determined performance problems resulting from the second analysis and the generated recommendations to generate optimization hints, wherein the optimization hints indicate modifications to the base access plan to produce a modified access plan having improved performance over the base access plan;
   generating a user interface providing a visualization of the optimization hints.

2. The method of claim 1, wherein heuristics rules are used to determine the performance problems with the base access plans.

3. The method of claim 1, wherein in the first analysis, inconsistencies and incompatibilities between the database being queried and the base access plan are considered in determining the performance problems.

4. The method of claim 1, wherein the second analysis considers additional information in providing the analysis of the performance problems determined during the first analysis.

5. The method of claim 4, wherein the second analysis considers output from a query engine that generated the base access plan and identifies areas of estimation error.

6. The method of claim 1, further comprising:
   using the determined performance problems from the first analysis to generate the tuning recommendations.

7. The method of claim 1, wherein generating the tuning recommendations further comprises generating recommendations to tune the database structure to improve query performance.

8. The method of claim 1, further comprising:
   generating in the user interface a visualization of the base access plan to enable a user to apply at least one of the modifications indicated in the optimization hints to modify the base access plan to produce the modified access plan.

9. The method of claim 8, wherein the visualized optimization hints indicate a plurality of join sequences for tables subject to the query, further comprising:
   receiving user selection of one join sequence from visualized optimization hints, wherein the modified access plan implements the user selected join sequence.

10. The method of claim 9, wherein the optimization hints further indicate join methods and table access methods, further comprising:
receiving user selection of at least one of the visualized join methods and/or table access methods in the user interface to improve the performance of the database query; and
implementing the user selected join method and/or table access method in the modified access plan.

11. The method of claim 8, further comprising:
processing the modified access plan to determine performance problems with the modified access plan;
processing the determined performance problems to determine further optimization hints indicating modifications of the modified access plan to improve the performance of the database query; and
rendering a visualization of the further optimization hints.

12. A system for tuning a database query, comprising:
means for providing a base access plan to implement the database query;
means for providing statistics including information on a layout of the database against which the query will be executed;
means for processing the statistics to determine performance problems with the base access plan as part of a first analysis of the base access plan;
means for processing the determined performance problems as part of a second analysis to provide an analysis of the determined performance problems and processing cost of the base access plan;
means for generating and displaying recommendations to tune the base access plan to improve performance;
means for receiving selection of one of the displayed recommendations to tune the base access plan;
means for modifying the base access plan with the selected displayed recommendation;
means for processing the analysis of the determined performance problems resulting from the second analysis and the generated recommendations to generate optimization hints, wherein the optimization hints indicate modifications to the base access plan to produce a modified access plan having improved performance over the base access plan; and
means for generating a user interface providing a visualization of the optimization hints.

13. The system of claim 12, wherein heuristics rules are used to determine the performance problems with the base access plans.

14. The system of claim 12, wherein in the first analysis, inconsistencies and incompatibilities between the database being queried and the base access plan are considered in determining the performance problems.

15. The system of claim 12, wherein the means for generating the tuning recommendations further generates recommendations to tune the database structure to improve query performance.

16. The system of claim 12, further comprising:
means for generating in the user interface a visualization of the base access plan to enable a user to apply at least one of the modifications indicated in the optimization hints to modify the base access plan to produce the modified access plan.

17. An article of manufacture for tuning a database query, wherein the article of manufacture causes operations to be performed, the operations comprising:
providing a base access plan to implement the database query;
providing statistics including information on a layout of the database against which the query will be executed;
processing the statistics to determine performance problems with the base access plan as part of a first analysis of the base access plan;
processing the determined performance problems as part of a second analysis to provide an analysis of the determined performance problems and processing cost of the base access plan;
generating and displaying recommendations to tune the base access plan to improve performance;
receiving selection of one of the displayed recommendations to tune the base access plan;
modifying the base access plan with the selected displayed recommendation;
processing the analysis of the determined performance problems resulting from the second analysis and the generated recommendations to generate optimization hints, wherein the optimization hints indicate modifications to the base access plan to produce a midified access plan having improved performance over the base access plan; and
generating a user interface providing a visualization of the optimization hints.

18. The article of manufacture of claim 17, wherein heuristics rules are used to determine the performance problems with the base access plans.

19. The article of manufacture of claim 17, wherein in the first analysis, inconsistencies and incompatibilities between the database being queried and the base access plan are considered in determining the performance problems.

20. The article of manufacture of claim 17, wherein the second analysis considers additional information in providing the analysis of the performance problems determined during the first analysis.

21. The article of manufacture of claim 20, wherein the second analysis considers output from a query engine that generated the base access plan and identifies areas of estimation error.

22. The article of manufacture of claim 17, further comprising:
using the determined performance problems from the first analysis to generate the tuning recommendations.

23. The article of manufacture of claim 17, wherein generating the tuning recommendations further comprises generating recommendations to tune the database structure to improve query performance.

24. The article of manufacture of claim 17, further comprising:
generating in the user interface a visualization of the base access plan to enable a user to apply at least one of the modifications indicated in the optimization hints to modify the base access plan to produce the modified access plan.

25. The article of manufacture of claim 24, wherein the visualized optimization hints indicate a plurality of join sequences for tables subject to the query, further comprising:
receiving user selection of one join sequence from visualized optimization hints, wherein the modified access plan implements the user selected join sequence.

26. The article of manufacture of claim 25, wherein the optimization hints further indicate join methods and table access methods, further comprising:
receiving user selection of at least one of the visualized join methods and/or table access methods in the user interface to improve the performance of the database query; and implementing the user selected join method and/or table access method in the modified access plan.

27. The article of manufacture of claim 24, further comprising:

processing the modified access plan to determine performance problems with the modified access plan;

processing the determined performance problems to determine further optimization hints indicating modifications of the modified access plan to improve the performance of the database query; and rendering a visualization of the further optimization hints.

* * * * *